US012579730B2

(12) United States Patent
Burns et al.

(10) Patent No.: US 12,579,730 B2
(45) Date of Patent: Mar. 17, 2026

(54) RAY-BOX INTERSECTION CIRCUITRY

(71) Applicant: Apple Inc., Cupertino, CA (US)

(72) Inventors: Christopher A. Burns, Austin, TX (US); Casper R. van Benthem, Abbots Langley (GB)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 18/329,055

(22) Filed: Jun. 5, 2023

(65) Prior Publication Data

US 2024/0404172 A1 Dec. 5, 2024

(51) Int. Cl.
G06T 15/06 (2011.01)
G06T 15/00 (2011.01)

(52) U.S. Cl.
CPC ............ G06T 15/06 (2013.01); G06T 15/005 (2013.01); *G06T 2210/21* (2013.01)

(58) Field of Classification Search
CPC ............................ G06T 15/06; G06T 2210/21
See application file for complete search history.

(56) References Cited

U.S. PATENT DOCUMENTS

| | | | | |
|---|---|---|---|---|
| 7,969,437 | B2 * | 6/2011 | Reshetov | ................ G06T 15/06 |
| | | | | 345/426 |
| 8,005,885 | B1 * | 8/2011 | Wilt | .................... G06F 7/49957 |
| | | | | 708/550 |
| 8,115,763 | B2 | 2/2012 | Woop et al. | |
| 8,411,088 | B2 | 4/2013 | Sevastianov et al. | |
| 8,736,610 | B2 | 5/2014 | McCombe et al. | |
| 9,547,932 | B2 | 1/2017 | Karras et al. | |
| 10,504,275 | B2 | 12/2019 | Wald et al. | |
| 11,295,508 | B2 | 4/2022 | Muthler et al. | |
| 11,450,057 | B2 | 9/2022 | Muthler et al. | |
| 11,527,036 | B2 | 12/2022 | Livesley et al. | |
| 2007/0024615 | A1 * | 2/2007 | Keller | ..................... G06T 15/55 |
| | | | | 345/421 |
| 2009/0244058 | A1 * | 10/2009 | Purcell | ................... G06T 15/06 |
| | | | | 345/418 |

(Continued)

OTHER PUBLICATIONS

Williams et al., An Efficient and Robust Ray-Box Intersection Algorithm, 2005 (Year: 2005).*

(Continued)

*Primary Examiner* — Phong X Nguyen
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to ray intersection tests for ray tracing in graphics processors. In some embodiments, a ray cache stores, transformed ray direction corresponding to a transform of a ray based on its dominant direction axis. Ray intersect acceleration circuitry may determine whether a ray intersects a bounding volume of a bounding volume hierarchy (BVH) data structure. Ray-plane test circuitry may perform a set of six ray-plane tests for the bounding volume using at most four floating-point multiplication operations by four multiplier circuits. The floating-point operations may operate on the transformed ray direction components from the ray cache circuitry and coordinate information for the bounding volume. Disclosed techniques may reduce area and power consumption by avoiding multiplier circuitry for some ray-plane tests.

21 Claims, 10 Drawing Sheets

Cache, for a ray in a graphics scene, transformed ray direction components corresponding to a transform of the ray based on its dominant direction axis
*910*

Determine whether a ray intersects a bounding volume of a bounding volume hierarchy data structure
*920*

Perform a set of six ray-plane tests for the bounding volume using at most four floating-point multiplication operations by four multiplier circuits, where the floating-point operations operate on: the cached transformed ray direction components and coordinate information for the bounding volume
*930*

(56) References Cited

U.S. PATENT DOCUMENTS

| | | | | |
|---|---|---|---|---|
| 2009/0284524 | A1* | 11/2009 | Shearer | G06T 15/06 |
| | | | | 345/419 |
| 2013/0321420 | A1* | 12/2013 | Laine | G06T 15/06 |
| | | | | 345/426 |
| 2020/0043218 | A1* | 2/2020 | Vaidyanathan | G06T 15/06 |
| 2021/0192829 | A1* | 6/2021 | Clark | G06T 11/20 |
| 2022/0036639 | A1* | 2/2022 | Rabbani Rankouhi | |
| | | | | G06T 17/005 |
| 2022/0036652 | A1* | 2/2022 | Rabbani Rankouhi | |
| | | | | G06F 9/4881 |
| 2022/0301254 | A1* | 9/2022 | Burns | G06T 15/06 |
| 2022/0343584 | A1* | 10/2022 | King | G06T 15/005 |
| 2022/0351460 | A1* | 11/2022 | Fenney | G06T 15/06 |
| 2023/0005209 | A1* | 1/2023 | Valsaraju | G06T 15/005 |
| 2023/0102071 | A1* | 3/2023 | Burns | G06T 15/06 |
| | | | | 345/426 |
| 2023/0252718 | A1* | 8/2023 | Fenney | G06T 1/20 |
| 2024/0153200 | A1* | 5/2024 | Suprun | G06T 7/70 |
| 2024/0404172 | A1* | 12/2024 | Burns | G06T 15/06 |

OTHER PUBLICATIONS

Thiago Ize et al., "Robust BVH Ray Traversal," Journal of Computer Graphics Techniques, vol. 2, No. 2, 2013, pp. 12-28.

K. Vaidyanathan et al., "Watertight Ray Traversal with Reduced Precision," High Performance Graphics (2016), the Eurographics Association, 8 pages.

Sven Woop et al., "Watertight Ray/Triangle Intersection," Journal of Computer Graphics Techniques, vol. 2, No. 1, 2013, pp. 65-82.

Chen Wang et al., "An Improved Ray Tracing Acceleration Algorithm Based on Bounding Volume Hierarchies," arXiv:2208. 10008v1 [eess.SP] Aug. 22, 2022, 6 pages.

* cited by examiner

*Vertex Data*

Processing
Flow 100

Graphics
Unit
150

*Example ray cache entry fields, populated for a ray prior to BVH traversal*

| Transformed ray direction vector components 210 | Active ray interval upper bound 220 | Reciprocals of non-dominant components 230 |
|---|---|---|
| $\vec{d} = [\dfrac{D_x}{D_z}, \dfrac{D_y}{D_z}, \dfrac{1}{Dz}]$ $\overline{d_x}, \overline{d_y}, \overline{d_z}$ | $\lambda_{max} = t_{max}D_z$ | $\dfrac{1}{d_x}, \dfrac{1}{d_y}$ |

*FIG. 2*

*Example operations performed by intersect circuitry for a given BVH node*

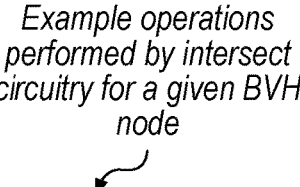

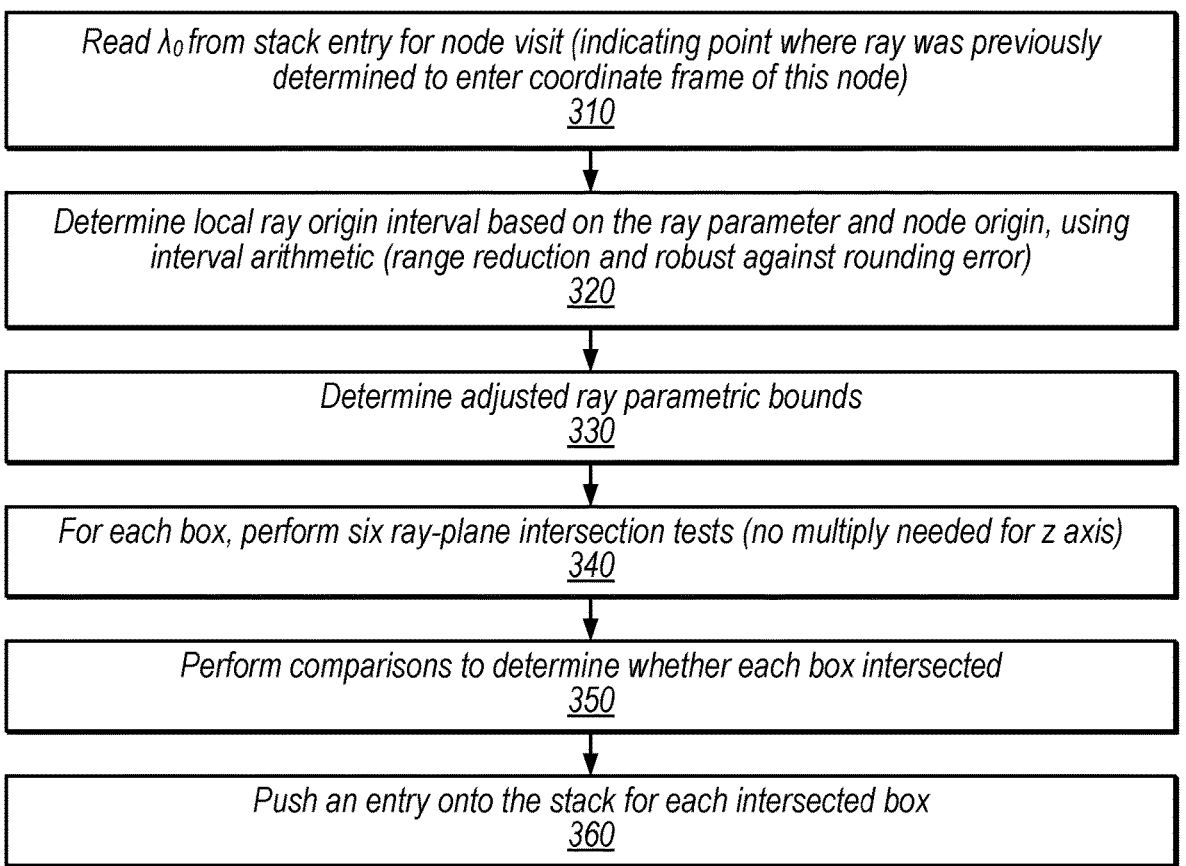

Read $\lambda_0$ from stack entry for node visit (indicating point where ray was previously determined to enter coordinate frame of this node)
310

Determine local ray origin interval based on the ray parameter and node origin, using interval arithmetic (range reduction and robust against rounding error)
320

Determine adjusted ray parametric bounds
330

For each box, perform six ray-plane intersection tests (no multiply needed for z axis)
340

Perform comparisons to determine whether each box intersected
350

Push an entry onto the stack for each intersected box
360

*FIG. 3*

*Origin of ray in world coordinate frame ($\vec{R}$)*

*Local origin of BVH node's affine coordinate frame ($\vec{Q}$)*

$d_x$ $d_y$ $\lambda_0$

*Local ray origin calculator*
*410*

*Local ray origin interval ($\bar{T}$)*

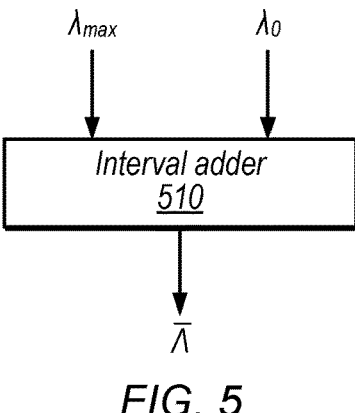

$\lambda_{max}$    $\lambda_0$

Interval adder
510

$\overline{\Lambda}$

*FIG. 5*

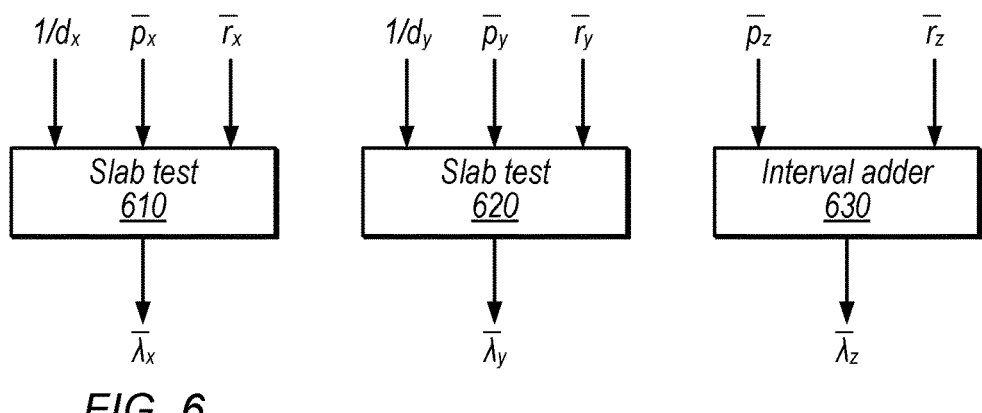

$1/d_x$    $\overline{p_x}$    $\overline{r_x}$        $1/d_y$    $\overline{p_y}$    $\overline{r_y}$        $\overline{p_z}$    $\overline{r_z}$ Slab test
610

Slab test
620

Interval adder
630

$\overline{\lambda_x}$    $\overline{\lambda_y}$    $\overline{\lambda_z}$

*FIG. 6*

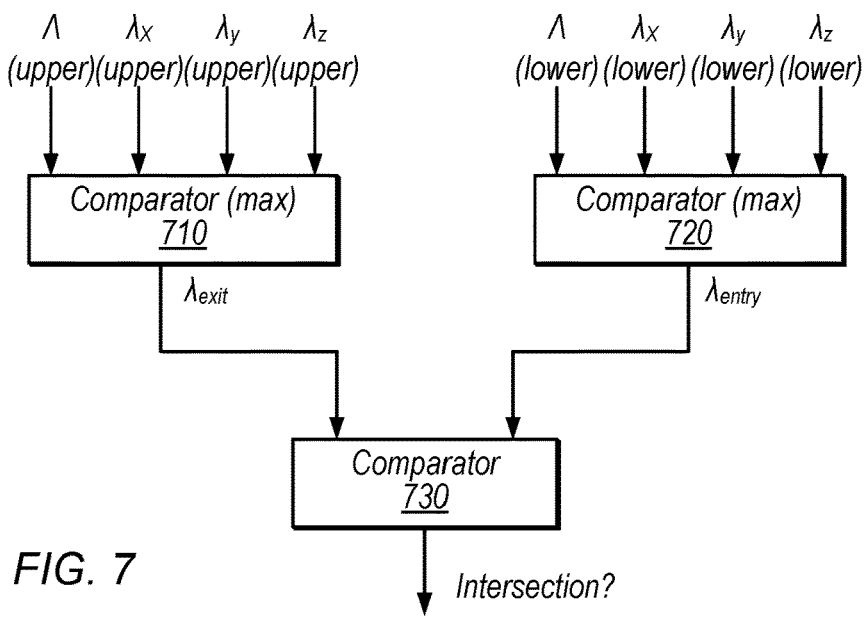

$\Lambda$    $\lambda_x$    $\lambda_y$    $\lambda_z$
(upper)(upper)(upper)(upper)

$\Lambda$    $\lambda_x$    $\lambda_y$    $\lambda_z$
(lower) (lower) (lower) (lower)

Comparator (max)
710

Comparator (max)
720

$\lambda_{exit}$ $\lambda_{entry}$

Comparator
730

Intersection?

*FIG. 7*

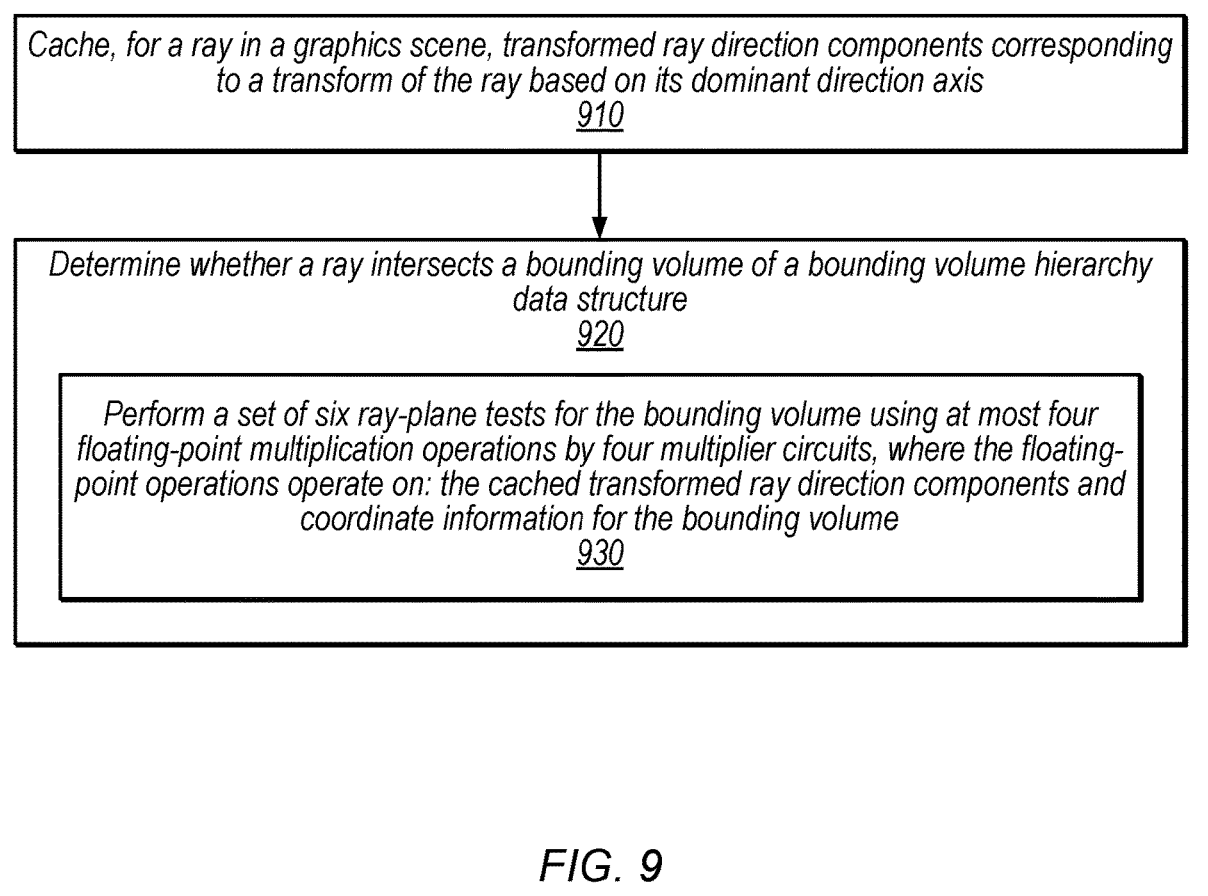

Cache, for a ray in a graphics scene, transformed ray direction components corresponding to a transform of the ray based on its dominant direction axis
910

Determine whether a ray intersects a bounding volume of a bounding volume hierarchy data structure
920

Perform a set of six ray-plane tests for the bounding volume using at most four floating-point multiplication operations by four multiplier circuits, where the floating-point operations operate on: the cached transformed ray direction components and coordinate information for the bounding volume
930

*FIG. 9*

RAY-BOX INTERSECTION CIRCUITRY

BACKGROUND

Technical Field

This disclosure relates generally to graphics processing and more particularly to circuitry configured to detect ray-box intersections in the context of ray tracing.

Description of Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

In some implementations, ray tracing circuitry traverses an acceleration data structure (ADS) such as a bounding volume hierarchy (BVH) to determine whether rays in a graphics scene intersect primitives in the graphics scene. Traversal may involve testing for intersection against progressively smaller bounding volumes until a set of primitives is determined for primitive testing. A given intersection test for a box-shaped volume may involve six ray-plane tests, for example.

BRIEF DESCRIPTION OF DRAWINGS

FIG. 2 is a diagram illustrating example information stored in a ray cache entry, according to some embodiments.

FIG. 3 is a flow diagram illustrating example box test techniques performed by ray intersect acceleration circuitry for a node of an acceleration data structure, according to some embodiments.

FIG. 5 is a block diagram illustrating example interval adder circuitry, according to some embodiments.

FIG. 6 is a block diagram illustrating example slab test and interval adder circuitry, according to some embodiments.

FIG. 7 is a diagram illustrating example comparator circuitry for quantized box intersection testing, according to some embodiments.

FIG. 9 is a flow diagram illustrating an example method, according to some embodiments.

DETAILED DESCRIPTION

Ray tracing in graphics processors simulates natural light by tracing rays from the camera to objects in the scene and recording intersections, e.g., to facilitate more accurate shading. For a given ray, the processor typically traverses a bounding volume hierarchy (BVH) acceleration data structure (ADS). This is much more efficient than testing a ray for intersection against all triangles in a scene, for example.

In particular, the BVH is typically organized as successively smaller bounding volumes (e.g., six-sided boxes), each of which is tested for intersection with the ray. If there is no intersection, traversal stops for that branch. If there is an intersection, traversal continues until child nodes are reached (e.g., corresponding to triangular primitives), which are tested for intersection. Each ray-box test typically utilizes six ray-plane intersection tests, each of which traditionally requires a multiplier. For wide-branching BVH's and parallel hardware accelerator testing, this might require a substantial number of floating-point multipliers. This may substantially affect processor area and power consumption. Note that the width of these multipliers may be reduced if lower-precision values are used, e.g., for box coordinates.

In disclosed embodiments, a ray cache stores certain pre-computed information for a ray (some of which may be in quantized form) and the information is utilized for various intersection tests during ADS traversal. For example, the ray cache may store transformed slopes for the ray direction such that the z direction corresponds to the dominant, largest-magnitude component of the ray direction vector. The ray cache may also store a transformed active ray interval upper bound and low-precision reciprocals of the direction components in the non-dominant directions. The stored values may include or imply intervals that are guaranteed to include more precise values prior to quantization. The ray cache may also store other information, such as the original ray, other properties of the ray, flags associated with the ray, etc.

Ray intersection accelerator circuitry may then, for a given BVH node, test for box intersections using cached ray data, interval arithmetic, and low-precision intersection tests. In particular, the accelerator circuitry may read a scaled ray parameter from a stack, calculate a local ray origin interval, calculate adjusted ray parametric bounds, perform six ray-plane tests, and perform intersection comparisons. Disclosed techniques may utilize only two interval multipliers (four traditional floating-point multipliers) for a set of six ray-plane tests for a box, which may advantageously reduce circuit area and power consumption for ray tracing.

In some embodiments, rounding circuitry is configured to properly round subnormal values in the context of various disclosed interval arithmetic (e.g., such that the sign of any rounding error remains consistent).

Graphics Processing Overview

Figure 1A:
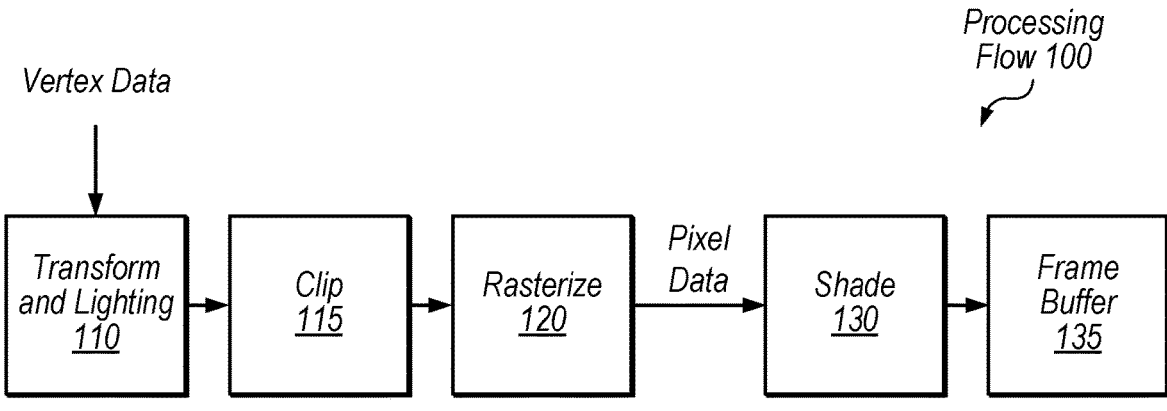
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
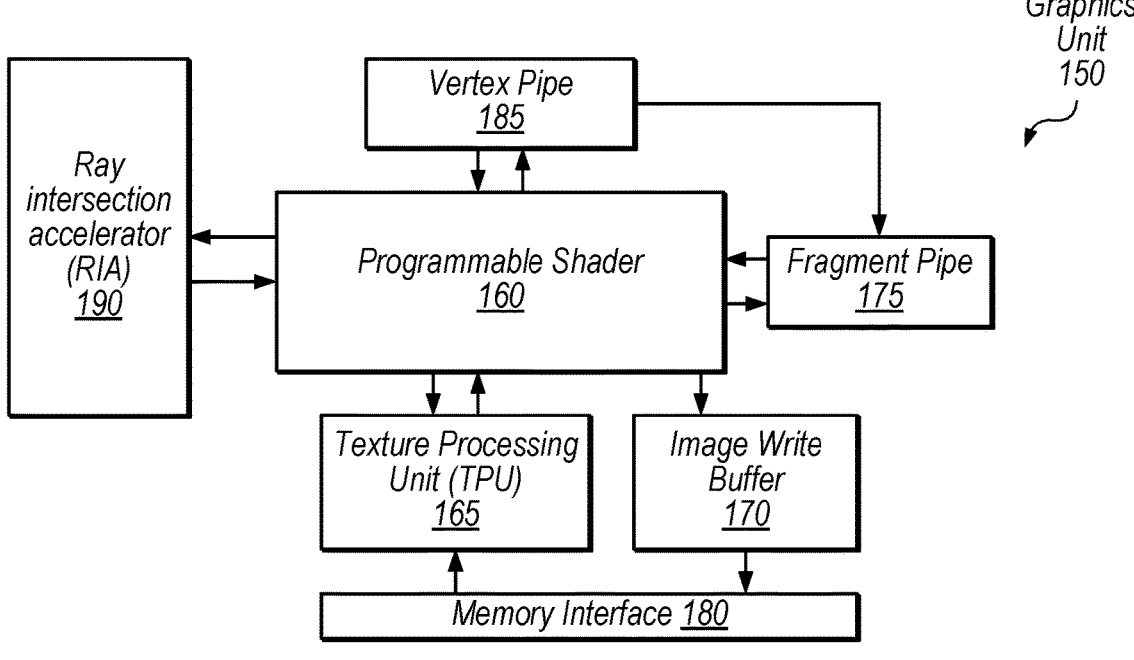
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations, as described in detail below. In some embodiments, RIA 190 is configured to traverse a BVH and provide a list of primitives for ray-primitive tests based on a single "ray intersect" instruction. In other embodiments, RIA 190 may include hardware to test a ray against a set of BVH boxes for a given node based on a single intersect instruction (and thus may execute multiple intersect instructions for a traversal of a BVH).

U.S. patent application Ser. No. 17/103,317, filed Nov. 24, 2020 and titled "Grouping Techniques for Ray Intersection Traversal," discusses example ray intersect accelerator techniques. Similarly, U.S. patent application Ser. No. 17/456, 483, filed Nov. 24, 4021 and titled "Ray Intersection Testing with Quantization and Interval Representations" discusses example quantization and interval arithmetic techniques for BVH intersection testing. Various disclosed techniques may be used in combination with techniques from the '317 and '483 applications, e.g., to replace or augment various hardware acceleration techniques discussed in those applications.

Symbols and Notational Conventions

This section sets out various naming conventions used in the present disclosure. In general, index $i \in 0,1,2$ indicates a cartesian coordinate axis. In the context of dominant-axis-based swizzling, these coordinates are labeled such $z=\text{argmax}[\max(|D_0|, |D_1|, |D_2|)]$. Also $x=(z+1)\bmod 3$ and $y=(z+2)\bmod 3$ which has the result that the z axis is the dominant ray direction. Unless otherwise noted, all cartesian vectors and points are presumed to have already been re-ordered according to this logic.

Ray parameters in a ray's native coordinate space are denoted t while $\lambda$ denotes ray parameters in a scaled parametric space. Interval quantities use an overhead bar, e.g., $\bar{x}$ refers to an interval representation with a lower bound and an upper bound (one of which may be implied based on the other, in some situations).

Various equations discussed in detail below may utilize the following values as inputs or produce these values as outputs:

$\vec{Q}$ Local origin of a BVH node's affine coordinate frame $p_i$ Box planes in world-space relative to the node coordinate frame origin $Q_i$ (a pair of parallel planes may be encoded as an interval)

$\vec{R}$ Origin of the ray in the world coordinate frame $\vec{D}$ Direction vector of the ray in the world coordinate frame $$w = \frac{1}{D_z}$$

Reciprocal of the ray's dominant direction component $$\vec{d} = \left[\frac{D_x}{D_z}, \frac{D_y}{D_z}, \frac{1}{D_z}\right]$$

Transformed ray direction vector t Parametric ray parameter with respective to the original world-space ray coordinates where $P_i = R_i + tD_i$ $\lambda = tD_z$ Ray parameter scaled by factor $D_z$ $t_{max}$ Parametric ray parameter value denoting the end point of the active interval of the ray $\lambda_{max} = t_{max}D_z$ Scaled parametric ray parameter value at the endpoint of the ray

Example Cached Ray Information

In some embodiments, prior to ADS traversal for a ray, the graphics processor is configured to compute and store certain values in a ray cache that is accessible to intersect acceleration circuitry.

FIG. 2 is a diagram illustrating example information stored in a ray cache entry, according to some embodiments. In the illustrated embodiment, an entry in a ray cache includes the following fields: transformed ray direction vector components 210, active ray interval upper bound 220, and reciprocals of non-dominant components 230. The illustrated example also provides equations for determining these values. The processor may tag a given entry with all or a portion of ray identifier information to allow accessing circuitry to determine which ray cache entry is assigned to a given ray. Note that in other embodiments, similar information may be attached to a ray without using a ray cache.

Transformed ray direction vector components 210 ($\vec{d}$), in the illustrated embodiment, are determined using round-towards-negative-infinity (RTNI) floating-point logic. These may also be referred to as slopes. These quantities may be lower bounds of an implicit interval, where the upper bound is one unit of least precision (ULP) larger. In these embodiments, the interval representation is implied to be $\bar{d}_i = [d_i, d_i + 1ulp]$ and each component is computable with a single accurate floating-point divide operation (or by a reciprocal operation followed by an interval multiplication, using an intermediate precision that preserves accuracy, e.g., to within 1 ULP).

Active ray interval upper bound 220 ($\lambda_{max}$), in the illustrated embodiment, is also computed using round-towards-positive-infinity (RTPI) floating-point logic according to the equation:

$$\lambda_{max} = t_{max}D_z \quad (1)$$

in some embodiments.

Reciprocals $$230 \left( \frac{1}{d_x} \text{ and } \frac{1}{d_y} \right),$$

in some embodiments, are computed similarly to the slopes, e.g., using a single floating-point operation with low-precision outputs and RTNI rounding behavior, with the upper bounds implied to be 1 ULP larger.

In some embodiments, each of the determined fields is stored using two bytes (which may be a lower precision than an original 32-bit representation of various ray values). Generally, in embodiments each of these quantities $$\left( d_x, d_y, d_z, \frac{1}{d_x}, \frac{1}{d_y}, \lambda_{max} \right)$$

is stored using N bytes, an entry in the ray cache utilizes 6×N bytes total.

As discussed in further detail below, various interval arithmetic expressions discussed herein may follow standard rules of interval arithmetic, with correct rounding modes to encapsulate any error (as discussed in further detail below with reference to FIG. 8). Generally, interval operations may utilize round-towards-negative-infinity (RTNI) for lower bounds numerator calculations and upper bounds denominator calculations. Similarly, interval operations may utilize round-towards-positive-infinity (RTPI) for upper bounds numerator calculations and lower bounds denominator calculations.

By storing disclosed information in a ray's cache entry, re-calculation of these values may be avoided during ADS traversal.

Overview of Box Test With Four Multipliers for a Six Ray-Plane Tests

FIG. 3 is a block diagram illustrating example intersection test techniques for a given node in a bounding volume hierarchy, according to some embodiments. At 310, in the illustrated example, intersect circuitry reads an approximate scaled ray parameter $\lambda_0$ from a traversal stack. As shown, this value indicates the point where the ray was previously determined to enter the coordinate frame of the node (or said another way, enter the bounding volume enclosing the boxes to be tested at the node). This value is represented using a greater floating-point precision than the ray cache values, in some embodiments. Note that a traversal stack is a well-understood structure, e.g., for traversing a BVH using a depth-first search. In disclosed embodiments, control circuitry is configured to push an updated $\lambda_0'$ on to the stack for child nodes after an update for the current node, e.g., where $\lambda_0' = \lambda_{entry} + \lambda_0$ and then retrieve the updated scaled ray parameter from the stack for the child nodes.

At 320, in the illustrated embodiment, the intersect circuitry determines a local ray origin interval based on the ray parameter accessed from the stack at 310 and based on a node origin. As shown, this calculation is performed using interval arithmetic and provides range reduction (providing a value with a smaller magnitude than $\vec{R}$) to allow subsequent calculations to user lower precision arithmetic, in some embodiments. This calculation may also provide robustness against rounding error for the subsequent intersection tests. In some embodiments, this calculation proceeds according to the following equations:

$$\vec{r_x} = [R_x - Q_x + \lambda_0 d_x, R_x - Q_x + \lambda_0(d_x + 1ulp)] \quad (2)$$

$$\vec{r_y} = [R_y - Q_y + \lambda_0 d_y, R_y - Q_y + \lambda_0(d_y + 1ulp)] \quad (3)$$

$$\vec{r_z} = [R_z - Q_z + \lambda_0, R_z - Q_z + \lambda_0] \quad (4)$$

At 330, in the illustrated embodiment, the intersect circuitry determines translated ray parametric bounds. In some embodiments, this calculation proceeds according to the following equation:

$$\bar{\Lambda} = [-\lambda_0, \lambda_{max} - \lambda_0] \quad (5)$$

At 340, in the illustrated embodiment, the intersect circuitry performs, for each box (e.g., for up to N children of the node) six ray-plane intersection tests. All or a portion of these tests (for a given child, among multiple children, or both) may be performed at least partially in parallel, which may utilize replicated floating-point circuitry. Equations 6-8 provide example calculations for ray-plane intersection tests. The multiplications of equations 6 and 7 may be implemented using interval multipliers. As shown, the test for the z dimension (after transform) in equation 8 does not require a multiplier:

$$\overline{\lambda}_x = \frac{1}{d_x}(\overline{p_x} - \overline{r_x}) \qquad (6)$$

$$\overline{\lambda}_y = \frac{1}{d_y}(\overline{p_y} - \overline{r_y}) \qquad (7)$$

$$\overline{\lambda}_z = (\overline{p_z} - \overline{r_z}) \qquad (8)$$

In some embodiments, each of these three tests correspond to the upper and lower planes in a given box axis direction (which are expressed as an interval). In some embodiments, the box planes $p_i$ are recorded directly in the nodes of the BVH. In some embodiments, the box planes may be compressed or encoded and may be decompressed or decoded to produce the input values for equations 6-8.

At 350, in the illustrated embodiment, the intersect circuitry performs comparisons to determine whether each of the child boxes is intersected. In some embodiments, these comparisons correspond to the following equations:

$$\lambda_{entry} = \max(\Lambda^{entry}, \lambda_x^{entry}, \lambda_y^{entry}, \lambda_z^{entry}) \qquad (9)$$

$$\lambda_{exit} = \max(\Lambda^{exit}, \lambda_x^{exit}, \lambda_y^{exit}, \lambda_z^{exit}) \qquad (10)$$

Where the entry and exit superscripts for the inputs to equations 9 and 10 may correspond to upper or lower values of the intervals based on the sign of $D_i$ in the corresponding axis. For example, according to the following pseudocode: lambda_entry[i]=D[i]<0.0? lambda[i].upper: lambda[i].lower and lambda_exit[i]=D[i]<0.0? lambda[i].lower: lambda[i].upper.

Further, intersect circuitry may determine the intersect result as follows:

$$intersection = \lambda_{entry} < \lambda_{exit} \qquad (11)$$

At 360, in the illustrated embodiment, the intersect circuitry pushes an entry onto the stack for each intersected box. As discussed above, the entry may include an updated ray parameter determined as $\lambda_0' = \lambda_{entry} + \lambda_0$ for a given box.

Example Intersect Circuitry

FIGS. 4-7 show example circuitry configured to perform the method of FIG. 3. In some embodiments, intersect control circuitry implements a finite state machine or executes code (e.g., microcode) to control various disclosed circuitry based on instructions executed by the graphics processor.

Figure 4:
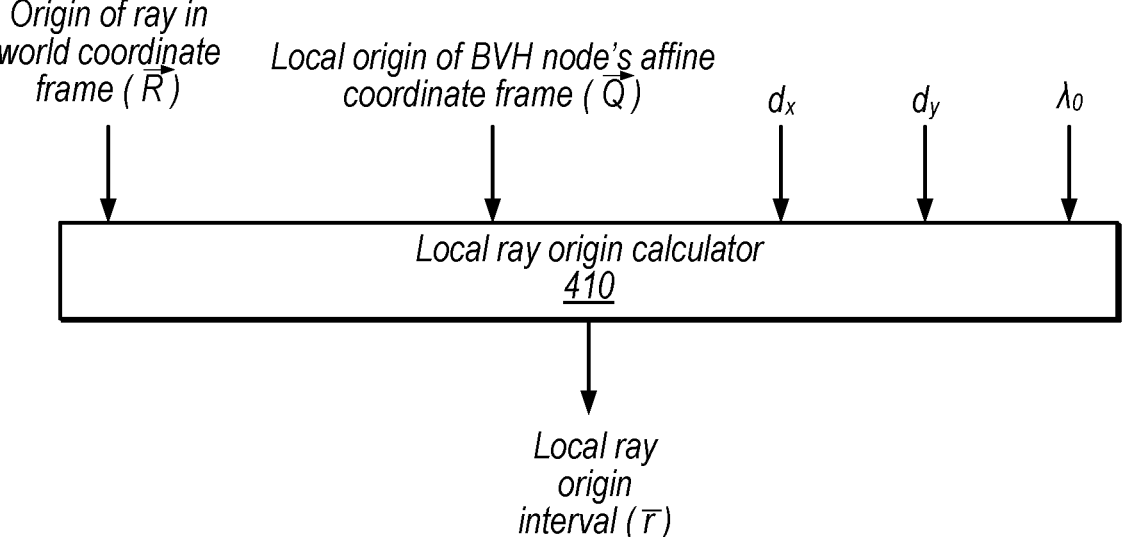
FIG. 4 is a block diagram illustrating example local ray origin calculator circuitry, according to some embodiments.

FIG. 4 is a block diagram illustrating example local ray origin calculator circuitry, according to some embodiments. In some embodiments, local ray origin calculator circuitry 410 is configured to perform element 320 of FIG. 3.

In the illustrated embodiment, circuitry 410 receives as inputs: an origin of a ray in the world coordinate frame ($\vec{R}$), a local origin of the BVH node's affine coordinate frame ($\vec{Q}$), the slope values for the non-dominant x and y axes, and the scaled ray parameter $\lambda_0$. Circuitry 410 outputs the local ray origin interval $\bar{r}$.

In some embodiments, circuitry 410 determines $\bar{r}$ by evaluating equations 2-4, e.g., using one or more floating-point multipliers, one or more floating-point negation circuits, and one or more floating-point adders. As discussed above, control circuitry may operate these floating-point circuits to properly perform interval arithmetic with proper rounding to ensure conservative intersect test results in subsequent calculations.

FIG. 5 is a block diagram illustrating example interval adder circuitry, according to some embodiments. In some embodiments, interval adder circuitry 510 is configured to perform element 330 of FIG. 3.

In the illustrated embodiment, circuitry 510 receives $-\lambda_0$ and $\lambda_{max}$ as inputs and produces $\overline{\Lambda}$ as an output, e.g., according to equation 5. In some embodiments, circuitry 510 includes floating-point negation circuitry and a floating-point adder and is configured to produce an interval result.

FIG. 6 is a block diagram illustrating example slab test and interval adder circuitry, according to some embodiments. In some embodiments, circuitry 610, 620, and 630 is configured to perform element 340 of FIG. 3.

In the illustrated example, the intersect circuitry includes slab test circuitry 610 and 620 and interval adder 630. Circuitry 610 receives the reciprocal of the x-axis slope, the interval representing the x-planes, and the x component of the ray origin interval representation as inputs. Circuitry 620 receives the reciprocal of the y-axis slope, the interval representing the y-planes, and the y component of the ray origin interval representation as inputs. Circuitry 630 receives the interval representing the z-planes and the z component of the ray origin interval representation as inputs. The circuits output the results of the ray-plane intersect tests for their respective directions. In some embodiments, circuitry 610, 620, and 630 respectively are configured to implement equations 6, 7, and 8.

For the six ray-plane tests implemented by circuits 610, 620, and 630, only four floating-point multipliers are required, in some embodiments. This is because the z-plane tests utilize an add operation but do not need a multiply operation, due to the transform and conservative use of ray information in the prior computations. As discussed above, this may advantageously reduce circuit area and power consumption of the intersection circuitry.

A given slab test circuit may include an interval multiplier (which may include two traditional floating-point multipliers). Generally, an interval multiplier circuit is configured to create a new interval that encompasses the possible combinations of the input intervals being multiplied, creating new upper and lower limits, e.g., [a.l, a.u]*[b.l, b.u]=>[y.l, y.u]. In some embodiments, an interval multiplier includes two or more traditional multipliers configured to perform the multiplications. For signed numbers, the interval multiplier may include multiplexer circuitry may route combinations of inputs to internal the multipliers so that the output interval properly represents the lower and upper bounds. To properly cover situations where multiple inputs are allowed to cross zero, four multipliers may be utilized. In some embodiments, however, it is guaranteed that one of the operands (e.g., the ray direction interval) does not cross zero during operation. In these embodiments, the interval multiplier may be implemented using only two traditional multipliers.

Floating-point addition and multiplication circuitry may be implemented using various appropriate circuit structures. As one example, floating-point adder circuitry may include comparator circuitry configured to detect the smaller mantissa for inversion, 2's compliment circuitry to invert an input for subtraction, adder circuitry configured to add the mantissa, mantissa shift circuitry, and leading zero count circuitry configured to normalize a result if needed. Floating-point multiplication circuitry may include XOR circuitry configured to operate on the sign bits, adder and bias circuitry configured to operate on the exponent inputs, integer multiplier circuitry configured to operate on the mantissa inputs, etc.

FIG. 7 is a diagram illustrating example comparator circuitry for quantized box intersection testing, according to some embodiments. In some embodiments, circuitry 710, 720, and 730 is configured to perform element 350 of FIG. 3.

Comparator 710, in some embodiments, is configured to determine the max of its four inputs and output the result as $\lambda_{exit}$. Comparator 720, in some embodiments, is configured to determine the max of its four inputs and output the result as $\lambda_{entry}$. Comparator 730, in the illustrated embodiment, is configured to assert an intersection signal if $\lambda_{entry} < \lambda_{exit}$.

Floating-point comparator circuitry may be implemented using various appropriate circuit structures. As one example, a floating-point comparator may implement a one-bit comparator for the sign bit, an E-bit comparator for the exponent field, and an M-bit comparator for the mantissa field. The floating-point comparator may then logically combine the outputs of the three comparators using AND gates and OR gates to generate output signals indicating which input is greater or whether the inputs are the same.

As discussed above, multiple instances of the circuitry of FIGS. 4-7 may be included in a graphics processor and may be configured to perform multiple ray-box tests in parallel, in a given cycle. Therefore, reductions in the circuit area of a given box tester may substantially impact overall circuit area.

Example Subnormal Handling for Certain Rounding Modes

The following discussion sets out techniques for handling subnormal values in the context of interval arithmetic for ray-box intersection tests. Various techniques discussed herein utilize interval arithmetic that guarantees numerical soundness of a ray-box intersection calculation. Said another way, the intersection calculation is conservative, such that floating-point rounding error contributes to the possibility of a false positive intersection result, but there is no possibility of a false negative result. Further, it is desirable to implement various floating-point arithmetic operations with low area and power, so various embodiments may choose to not handle subnormal floating-point values (values that fill the underflow gap around zero in floating-point representations).

Traditionally, architectures that do not handle subnormal values flush subnormal input values to signed zero before performing arithmetic and flush subnormal output values to signed zero prior to rounding. Certain instruction set architectures define this behavior. This traditional behavior, however, is not consistent with certain rounding modes, e.g., that bias magnitudes away from zero. Examples of such rounding modes include round-towards-positive infinity (RTPI)

on positive values and round-towards-negative-infinity (RTNI) on negative values. These rounding modes may be important for interval arithmetic. For example, computing correct upper bounds should bias results towards positive infinity, but flushing a small positive subnormal result to zero would violate this guarantee.

Therefore, in various embodiments, control circuitry is configured to properly handle subnormal flushing to produce correct results for biased rounding modes. The subnormal flushing behavior for inputs and outputs may depend on: the effective sign of a given value, the rounding mode to be applied after the operation, and whether the input is a numerator or denominator of the operation.

Figure 8:
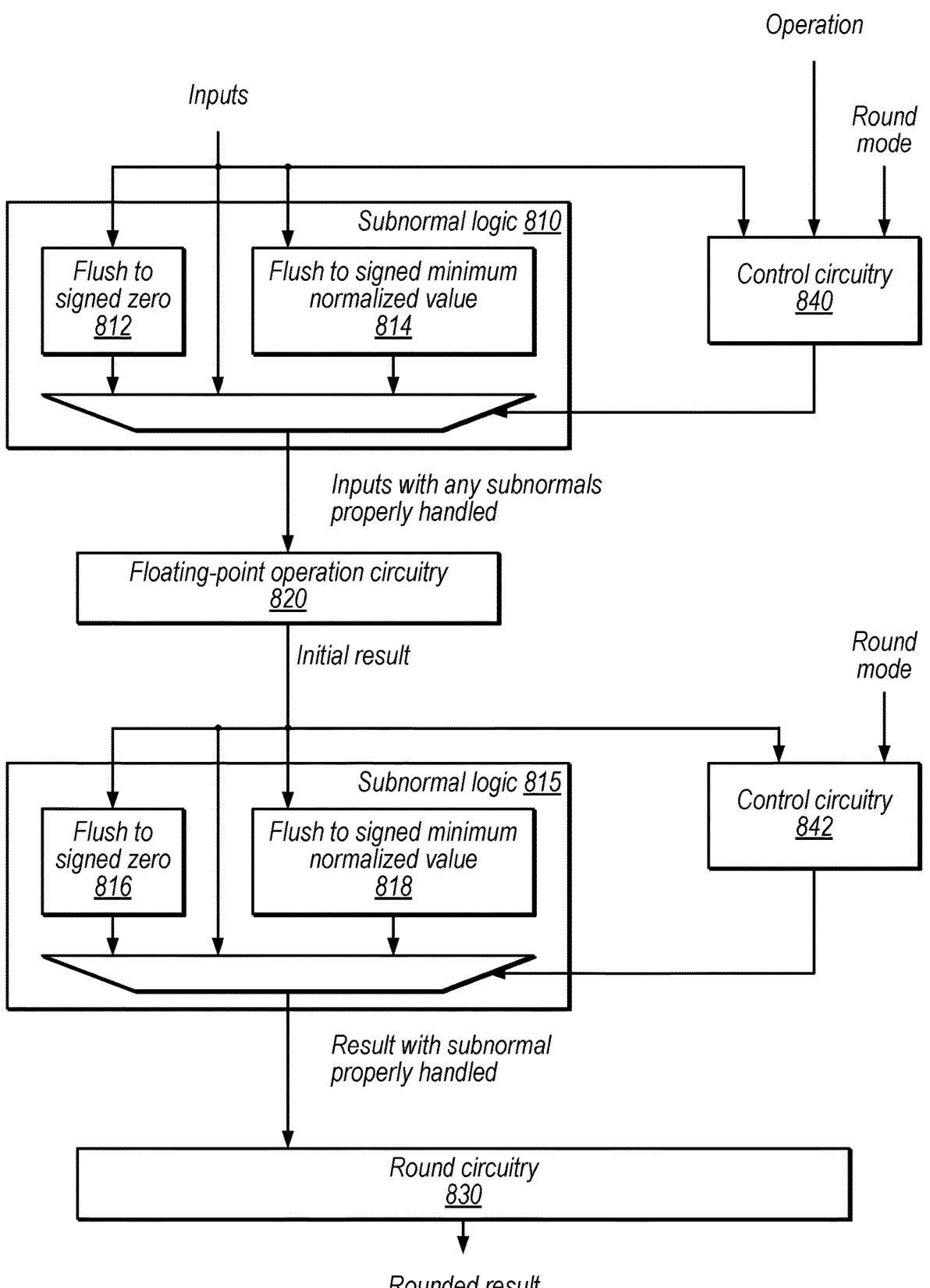
FIG. 8 is a block diagram illustrating example subnormal rounding logic, according to some embodiments.

FIG. 8 is a block diagram illustrating example subnormal rounding logic, according to some embodiments. In the illustrated embodiment, a processor includes subnormal logic 810 and 815, floating-point operation circuitry 820, round circuitry 830, and control circuitry 840 and 842.

Subnormal logic 810, in some embodiments, is configured to handle subnormal input values. As shown, subnormal logic 810 receives inputs for a floating-point arithmetic operation. Control circuitry 140 receives the inputs, the operation, and a rounding mode. If any of the inputs are subnormal, subnormal logic 810 may flush those inputs for certain rounding modes. In particular, flush to signed zero circuitry 812 is configured to flush an input to signed zero and flush to signed minimum normalized value 814 is configured to flush an input to the smallest non-zero signed normalized value closest to the subnormal input. Control circuitry 840 is configured to select from the original inputs and the outputs of circuitry 812 and 814 to properly provide inputs to floating-point operation circuitry 820.

For example, for a multiply-add, control circuitry 840 may determine whether the product of the multiply is negative based on the signs of the multiplicands. The processor may flush a given multiplicand to a signed minimum normalized value if the input is subnormal and the rounding mode is RTNI and the product is negative or if the rounding mode is RTPI and the product is positive. The processor may flush the addend to a signed minimum normalized value if the addend is subnormal and the rounding mode is RTNI and the addend is negative or the rounding mode is RTPI and the addend is positive. (Note that while the prior sentences may be difficult to parse, example pseudocode for this logic included below with parentheses for clarification). The processor may flush subnormal input values to zero in other situations.

As another example, for a divide, the processor may flush the numerator to a signed minimum normalized value when the numerator is subnormal and the rounding mode is RTNI and the numerator is negative or the rounding mode is RTPI and the numerator is positive. The logic may be reversed for the denominator, e.g., such that the processor is configured to flush the denominator to a signed minimum normalized value when the denominator is subnormal and the rounding mode is RTNI and the denominator is positive or the rounding mode is RTPI and the denominator is negative.

Subnormal logic 815, in the illustrated example, includes circuitry 816 configured to flush an initial result to signed zero and circuitry 818 configured to flush an initial result to a signed minimum normalized value. Control circuitry 842 is configured to select from the initial result and the outputs of circuitry 816 and 818 based on the initial result and the round mode. Note that when underflow occurs, the initial result provided to subnormal logic 815 may be a typical floating-point representation or may omit at least a portion of the actual result and provide a separate signal indicating that underflow occurred. Because the illustrated flushing logic is integrated with the arithmetic operation, in the illustrated example, it may not add substantial area or delay.

As an example of flushing a subnormal result for a given operation, the processor may flush the result to a signed minimum normalized value if the rounding mode is RTNI and the result is negative or if the rounding mode is RTPI and the result is positive. The processor may also flush certain subnormal values to a signed minimum normalized value in round up (away from zero) modes. The processor may flush other subnormal results to zero. These examples are reflected in the pseudocode discussed below.

Floating-point operation circuitry 820, in some embodiments, is configured to perform a floating-point arithmetic operation. For example, circuitry 820 may be configured to perform an add, multiply, divide, reciprocal, or some combination thereof. As shown, floating-point operation circuitry 820 receives inputs from subnormal logic 810 with any subnormal values properly flushed and provides an initial result to subnormal logic 815. Subnormal logic 815 then flushes the result properly (if subnormal) and provides the result to round circuitry 830.

Round circuitry 830, in the illustrated embodiment, is configured to round the result based on the specified rounding mode. As discussed above, round circuitry 830 may use RTNI for lower bounds numerator calculations and upper bounds denominator calculations and may use round-towards-positive-infinity (RTPI) for upper bounds numerator calculations and lower bounds denominator calculations discussed herein.

In some embodiments, when chaining RTNI/RTPI operations, subnormals may not be produced, so subnormal logic may be disabled in these scenarios.

In some embodiments, the circuitry of FIG. 8 is configured to implement the following Python-like pseudocode for fused multiply-add and division operations, where the flushSubnormalsConsistentWithRounding value indicates whether non-traditional subnormal handling is to be performed. As reflected in this pseudocode, subnormal logic is configured to flush inputs, outputs, or both to a signed minimum normalized value in certain scenarios (instead of flushing to signed zero) to properly facilitate conservative interval arithmetic.

Similar techniques may be implemented for other operations such as addition, multiplication, and reciprocal operations, although not shown in the pseudocode below.

```
# RTNI : Round Towards Negative Infinity
# RTPI : Round Towards Positive Infinity
# RUP : Round Up (Away From Zero)
# d = a * b + c
def fma (a, b, c, roundingMode, flushSubnormalsConsistentWithRounding):
    if flushSubnormalsConsistentWithRounding:
        if isSubnormal(c):
            if (roundingMode == RUP ) or (roundingMode == RTNI and
            hasNegativeSign(c)) or (roundingMode == RTPI and
            !hasNegativeSign(c)) :
                c = flushToSignedMinimumNormalizedValue(c)
            else:
                c = flushToSignedZero(c)
        # Operands a and b are handled according to the effective sign of their product
        productIsNegative = hasNegativeSign(a) xor hasNegativeSign(b)
        if isSubnormal(a):
            if (roundingMode == RUP ) or (roundingMode == RTNI and
            productIsNegative) or (roundingMode == RTPI and !productIsNegative) :
                a = flushToSignedMinimumNormalizedValue(a)
            else:
                a = flushToSignedZero(a)
        if isSubnormal(b):
            if (roundingMode == RUP ) or (roundingMode == RTNI and
            productIsNegative) or (roundingMode == RTPI and !productIsNegative) :
                b = flushToSignedMinimumNormalizedValue(b)
            else:
                b = flushToSignedZero(b)
    resultBeforeRounding = fma(a, b, c)
    roundedResult = round(resultBeforeRounding, roundingMode)
    # Flush output subnormals prior to rounding
    if flushSubnormalsConsistentWithRounding and isSubnormal(resultBeforeRounding):
        if (roundingMode == RUP ) or (roundingMode == RTNI and
        hasNegativeSign(resultBeforeRounding)) or (roundingMode == RTPI and
        !hasNegativeSign(resultBeforeRounding)) :
            roundedResult =
            flushToSignedMinimumNormalizedValue(resultBeforeRounding)
        else:
            roundedResult = flushToSignedZero(resultBeforeRounding)
    return roundedResult
def div (x, y, roundingMode, flushSubnormalsConsistentWithRounding):
    # Flush input numerator
    if flushSubnormalsConsistentWithRounding and isSubnormal(x):
        if (roundingMode == RUP ) or (roundingMode == RTNI and
        hasNegativeSign(x)) or (roundingMode == RTPI and !hasNegativeSign(x)) :
            x = flushToSignedMinimumNormalizedValue(x)
        else:
            x = flushToSignedZero(x)
```

-continued

```
# Flush input denominator
if flushSubnormalsConsistentWithRounding and isSubnormal(y):
    # Since y is in the denominator, the logic is reversed
    if (roundingMode == RUP ) or (roundingMode == RTNI and
    !hasNegativeSign(y)) or (roundingMode == RTPI and hasNegativeSign(y)) :
        y = flushToSignedMinimumNormalizedValue(x)
    else:
        y = flushToSignedZero(y)
# Compute the quotient
resultBeforeRounding = div(x, y)
roundedResult = roundResult(resultBeforeRounding, roundingMode)
# Flush output subnormals prior to rounding
if flushSubnormalsConsistentWithRounding and isSubnormal(resultBeforeRounding):
    if (roundingMode == RUP ) or (roundingMode == RTNI and
    hasNegativeSign(resultBeforeRounding)) or (roundingMode == RTPI and
    !hasNegativeSign(resultBeforeRounding)) :
        roundedResult =
        flushToSignedMinimumNormalized Value(resultBeforeRounding)
    else:
        roundedResult = flushToSignedZero(resultBeforeRounding)
return roundedResult
```

Example Method

FIG. 9 is a flow diagram illustrating an example method for performing ray-box intersection tests, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, a computing system (e.g., ray cache circuitry configured as discussed above with reference to FIG. 2) caches, for a ray in a graphics scene, transformed ray direction components corresponding to a transform of the ray based on its dominant direction axis.

In some embodiments, the ray cache also caches a transformed active ray interval upper bound and reciprocals of non-dominant components of the ray direction.

At 920, in the illustrated embodiment, the computing system (e.g., ray intersect acceleration circuitry such as RIA 190) determines whether a ray intersects a bounding volume of a bounding volume hierarchy (BVH) data structure. In the illustrated embodiment, this includes element 930.

At 930, in the illustrated embodiment, the computing system (e.g., ray-plane test circuitry) performs a set of six ray-plane tests for the bounding volume using at most four floating-point multiplication operations by four multiplier circuits (which may be included in two interval multipliers). In some embodiments, the floating-point operations operate on: the transformed ray direction components from the ray cache circuitry and coordinate information for the bounding volume.

In some embodiments, a first multiplier circuit of the four multiplier circuits is configured to perform a multiplication operation for a first ray-plane test for a first non-dominant direction axis, a second multiplier circuit of the four multiplier circuits is configured to perform a multiplication operation for a second ray-plane test for the first non-dominant direction axis, a third multiplier circuit of the four multiplier circuits is configured to perform a multiplication operation for a third ray-plane test for a second non-dominant direction axis, a fourth multiplier circuit of the four multiplier circuits is configured to perform a multiplication operation for a fourth ray-plane test for the second non-dominant direction axis, and the ray intersect acceleration circuitry is configured to perform respective difference operations (and no multiply operations) for fifth and sixth ray-plane tests for the dominant direction axis. In some embodiments, routing circuitry (e.g., one or more multiplexers) is configured to properly route input operands to multiplier inputs based on the signs of the input operands.

In some embodiments, the ray intersect acceleration circuitry is further configured to: determine a local ray origin interval based on a local node origin (e.g., using circuitry 410), one or more transformed ray direction components from the ray cache, and a current active ray interval value (e.g., $\lambda_0$). The ray intersect acceleration circuitry may determine adjusted ray parametric bounds based on the active ray interval upper bound and the current active ray interval value (e.g., using circuitry 510). The ray intersect acceleration circuitry may perform the ray-plane tests based on the local ray origin interval (e.g., using circuitry 610, 620, and 630). The ray intersect acceleration circuitry may perform comparison operations based on the adjusted ray parametric bounds and the ray-plane tests to determine an intersection result for the bounding volume (e.g., using comparators 710, 720, and 730).

In some embodiments, the ray intersect acceleration circuitry is further configured to: retrieve a transformed ray active interval value from a traversal stack for the ray-plane tests and push updated transformed active ray interval values (e.g., $\lambda_0'$) onto the traversal stack for one or more intersected bounding volumes.

In some embodiments, the ray intersect acceleration circuitry is configured to multiply a parametric ray parameter value indicating an end point of an active interval of the ray by a dominant direction component of a direction of the ray, using round to positive infinity rounding, to determine the transformed active ray interval upper bound. In some embodiments, the ray cache circuitry is configured to store the transformed ray direction components, the transformed active ray interval upper bound, and the reciprocals of the non-dominant components of the ray direction in a reduced-precision form (e.g., a 16-bit format), relative to initial representations of a ray direction and a ray interval (e.g., a 32-bit format).

In some embodiments, the ray intersect acceleration circuitry is configured to perform interval arithmetic on interval representations of input values that represent upper and lower bounds of quantized values. In some embodiments, the ray intersect acceleration circuitry is configured to: round towards negative infinity for lower bounds numerator determinations and upper bounds denominator determinations and round towards positive infinity for upper bounds numerator determinations and lower bounds denominator determinations. In some embodiments, the ray intersect acceleration circuitry includes subnormal rounding control circuitry (e.g., logic 810) configured to flush one or more subnormal values to a signed minimum normalized value prior to an interval arithmetic operation by the ray intersect acceleration circuitry.

Example Device

Figure 10:
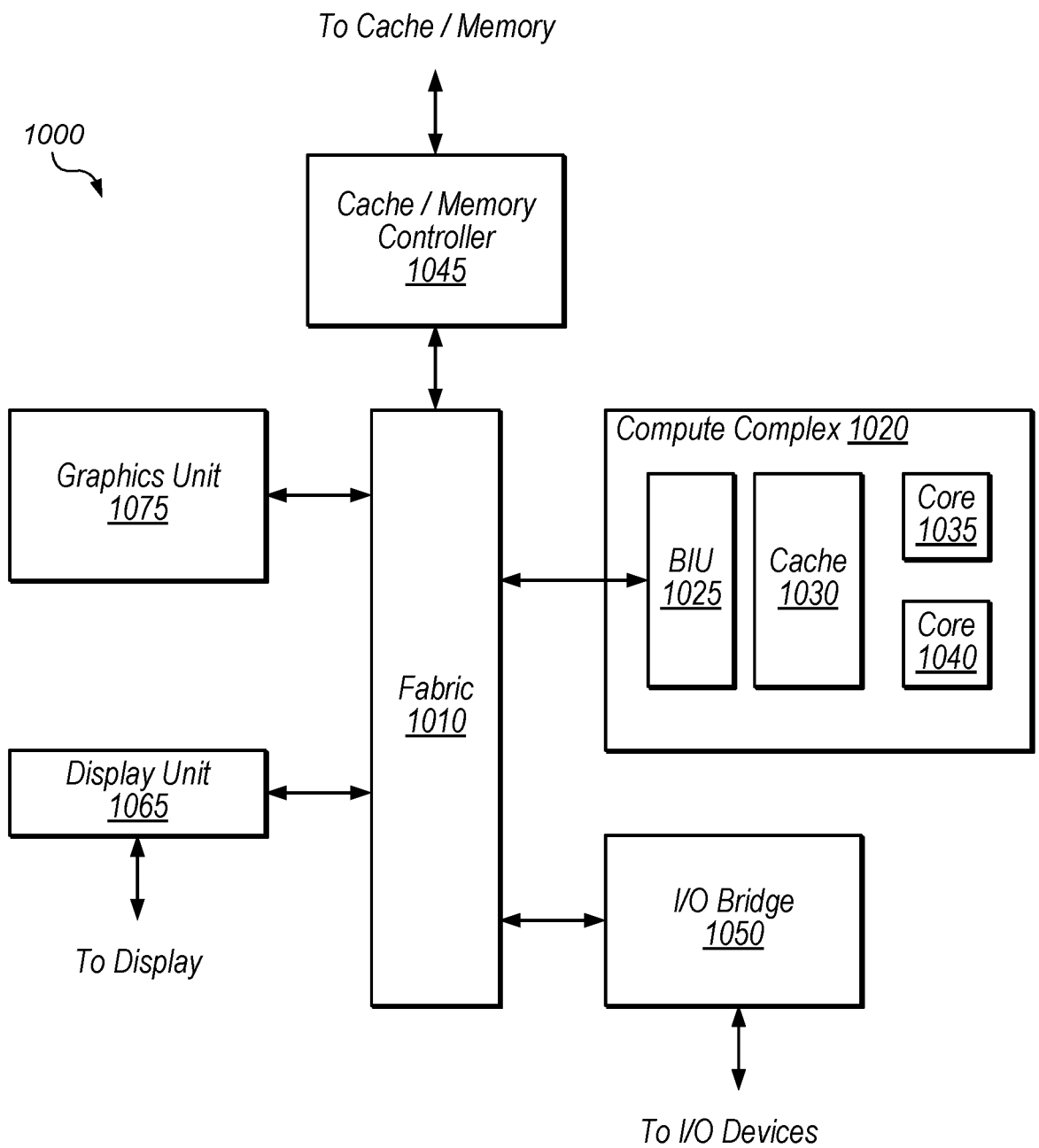
FIG. 10 is a block diagram illustrating an example computing device, according to some embodiments.

Referring now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Graphics unit 1075 may include one or more processors, e.g., one or more graphics processing units (GPU's). Graphics unit 1075 may receive graphics-oriented instructions, such as OPENGL®, Metal, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may improve ray tracing performance of graphics unit 1075 at a given power consumption or may reduce power consumption and area at a given performance point, relative to traditional techniques.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1000 with connectivity to various types of other devices and networks.

Example Applications

Figure 11:
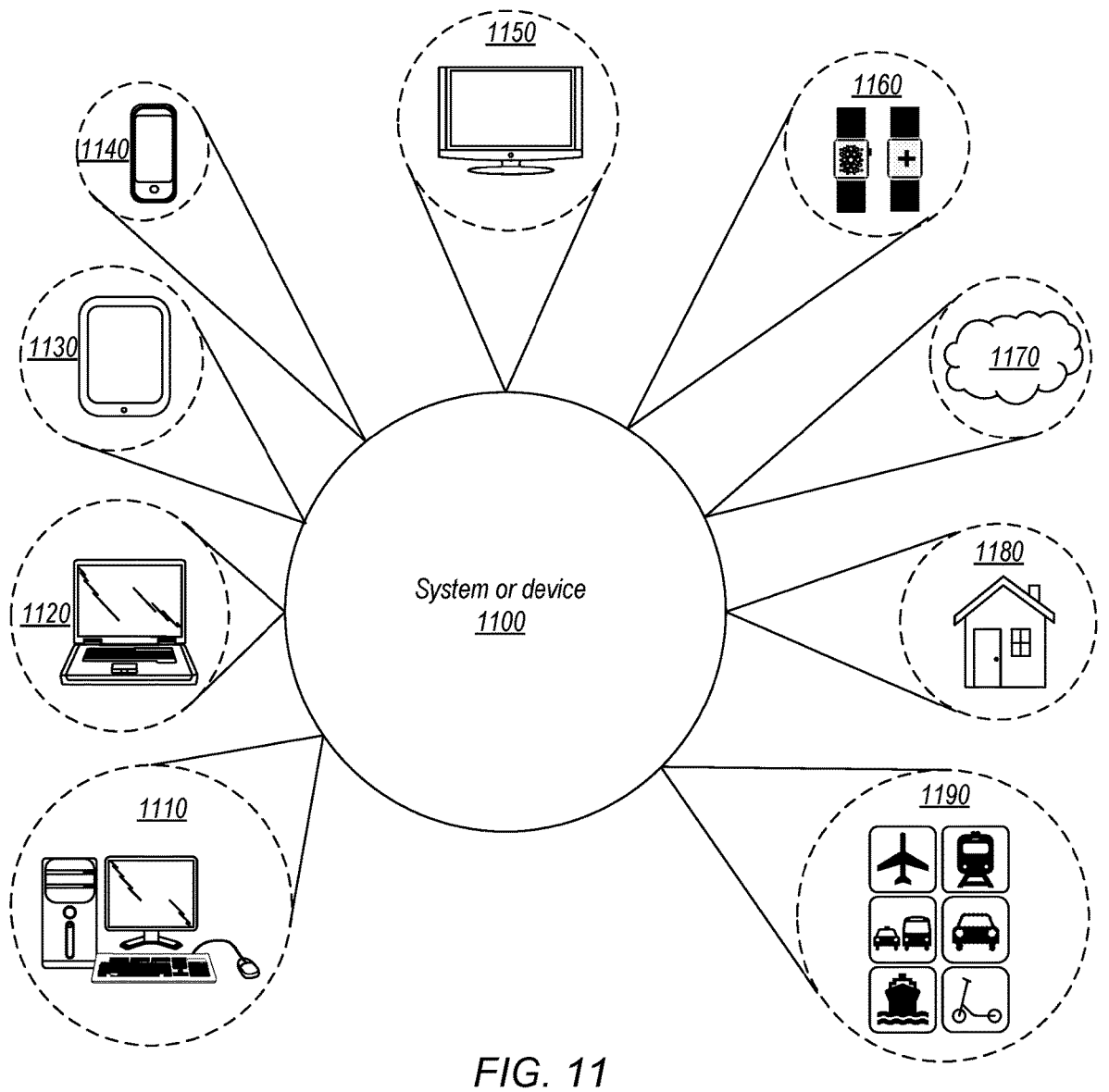
FIG. 11 is a diagram illustrating example applications of disclosed systems and devices, according to some embodiments.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a computing system configured to generate a simulation model of the hardware circuit, fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
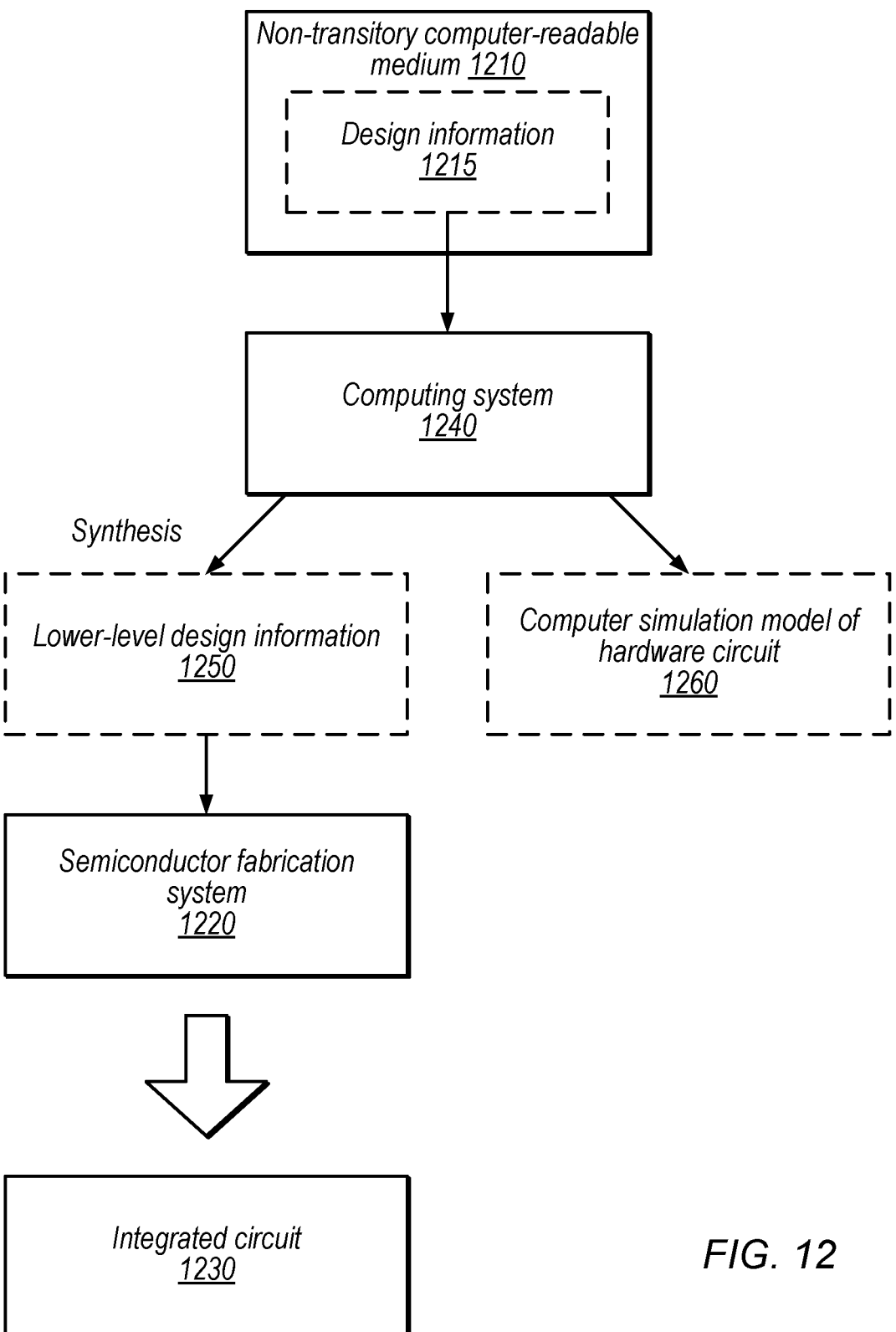
FIG. 12 is a block diagram illustrating an example computer-readable medium that stores circuit design information, according to some embodiments.

FIG. 12 is a block diagram illustrating an example non-transitory computer-readable storage medium that stores circuit design information, according to some embodiments. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate a computer simulation model of a hardware circuit 1260. For example, computing system 1240 may execute instructions of a hardware description language that includes register transfer level (RTL) code, behavioral code, structural code, or some combination thereof. The simulation model may facilitate verification of the functional correctness of the hardware design, power consumption estimates, timing estimates, etc.

In the illustrated example, computing system 1240 also processes the design information to generate lower-level design information 1250 (e.g., gate-level design information, a netlist, etc.). This may include synthesis, as shown. Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls, programs, or otherwise configures the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, System Verilog. RHDL, M, MyHDL, etc. The format of various design information may be recognized by one or more applications executed by computing system 1240, semiconductor fabrication system 1220, or both. In some embodiments, design information may include one or more cell libraries which specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Design information 1250 may include mask design data that may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1B, 4-8, and 10. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

\* \* \*

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

***

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
ray cache circuitry configured to cache, for a ray in a graphics scene:
transformed ray direction components corresponding to a transform of the ray based on its dominant direction axis;
ray intersect acceleration circuitry configured to determine whether a ray intersects a bounding volume of a bounding volume hierarchy (BVH) data structure, including:
ray-plane test circuitry configured to perform a set of six ray-plane tests for the bounding volume using at most four floating-point multiplication operations by four multiplier circuits, wherein the floating-point multiplication operations operate on:
the transformed ray direction components from the ray cache circuitry; and
coordinate information for the bounding volume.

2. The apparatus of claim 1, wherein the ray cache circuitry is further configured to cache, for the ray:
a transformed active ray interval upper bound; and
reciprocals of non-dominant components of the ray direction.

3. The apparatus of claim 2, wherein the ray intersect acceleration circuitry is configured to multiply a parametric ray parameter value indicating an end point of an active interval of the ray by a dominant direction component of a direction of the ray, using round to positive infinity rounding, to determine the transformed active ray interval upper bound.

4. The apparatus of claim 2, wherein the ray cache circuitry is configured to store the transformed ray direction components, the transformed active ray interval upper bound, and the reciprocals of the non-dominant components of the ray direction in a reduced-precision form, relative to initial representations of a ray direction and a ray interval.

5. The apparatus of claim 2, wherein the ray intersect acceleration circuitry is further configured to:
determine a local ray origin interval based on a local node origin, one or more transformed ray direction components from the ray cache circuitry, and a current active ray interval value;
determine adjusted ray parametric bounds based on the active ray interval upper bound and the current active ray interval value;
perform the ray-plane tests based on the local ray origin interval; and
perform comparison operations based on the adjusted ray parametric bounds and the ray-plane tests to determine an intersection result for the bounding volume.

6. The apparatus of claim 5, wherein the ray intersect acceleration circuitry is further configured to:
retrieve a transformed ray active interval value from a traversal stack for the ray-plane tests; and
push updated transformed active ray interval values onto the traversal stack for one or more intersected bounding volumes.

7. The apparatus of claim 1, wherein the ray intersect acceleration circuitry is configured to perform interval arithmetic on interval representations of input values that represent upper and lower bounds of quantized values.

8. The apparatus of claim 7, wherein:
the ray intersect acceleration circuitry is configured to:
round towards negative infinity for lower bounds numerator determinations and upper bounds denominator determinations; and
round towards positive infinity for upper bounds numerator determinations and lower bounds denominator determinations; and
the ray intersect acceleration circuitry includes subnormal rounding control circuitry configured to flush one or more subnormal values to a signed minimum normalized value prior to an interval arithmetic operation by the ray intersect acceleration circuitry.

9. The apparatus of claim 1, wherein:
a first multiplier circuit of the four multiplier circuits is configured to perform a multiplication operation for a first ray-plane test for a first non-dominant direction axis;
a second multiplier circuit of the four multiplier circuits is configured to perform a multiplication operation for a second ray-plane test for the first non-dominant direction axis;
a third multiplier circuit of the four multiplier circuits is configured to perform a multiplication operation for a third ray-plane test for a second non-dominant direction axis;

a fourth multiplier circuit of the four multiplier circuits is configured to perform a multiplication operation for a fourth ray-plane test for the second non-dominant direction axis; and the ray intersect acceleration circuitry is configured to perform respective difference operations for fifth and sixth ray-plane tests for the dominant direction axis.

10. The apparatus of claim 1, wherein the apparatus is a computing device that further includes:

a central processing unit;

a display; and network interface circuitry.

11. The apparatus of claim 1, wherein apparatus includes:

a plurality of single-instruction multiple-data pipelines configured to execute instructions; and fixed-function circuitry configured to control the single-instruction multiple-data pipelines to perform operations for at least one of the following types of programs:

graphics shader programs; and machine learning programs.

12. The apparatus of claim 1, wherein the ray-plane test circuitry includes:

slab test circuitry that includes multiplication circuitry configured to perform the at most four floating-point multiplication operations; and interval adder circuitry configured to perform an interval add for the dominant direction axis.

13. A method, comprising:

caching, by a computing system for a ray in a graphics scene, transformed ray direction components corresponding to a transform of the ray based on its dominant direction axis;

determining, by the computing system, whether a ray intersects a bounding volume of a bounding volume hierarchy (BVH) data structure, including performing a set of six ray-plane tests for the bounding volume using at most four floating-point multiplication operations by four multiplier circuits, wherein the floating-point multiplication operations operate on:

the cached transformed ray direction components; and coordinate information for the bounding volume.

14. The method of claim 13, further comprising:

caching, by the computing system for the ray, in a lower-precision format than an original format used to store ray parameters:

a transformed active ray interval upper bound; and reciprocals of non-dominant components of the ray direction.

15. The method of claim 13, further comprising:

determining, by the computing system, a local ray origin interval based on a local node origin, one or more cached transformed ray direction components, and a current active ray interval value;

determining, by the computing system, adjusted ray parametric bounds based on the active ray interval upper bound and the current active ray interval value;

performing, by the computing system, the ray-plane tests based on the local ray origin interval; and performing, by the computing system, comparison operations based on the adjusted ray parametric bounds and the ray-plane tests to determine an intersection result for the bounding volume.

16. The method of claim 13, wherein the determining includes:

rounding towards negative infinity for lower bounds numerator determinations and upper bounds denominator determinations; and rounding towards positive infinity for upper bounds numerator determinations and lower bounds denominator determinations; and flushing one or more subnormal values to a signed minimum normalized value prior to an interval arithmetic operation by the ray intersect acceleration circuitry.

17. A non-transitory computer-readable medium having instructions of a hardware description programming language stored thereon that, when processed by a computing system, program the computing system to generate a computer simulation model, wherein the model represents a hardware circuit that includes:

ray cache circuitry configured to cache, for a ray in a graphics scene, transformed ray direction components corresponding to a transform of the ray based on its dominant direction axis;

ray intersect acceleration circuitry configured to determine whether a ray intersects a bounding volume of a bounding volume hierarchy (BVH) data structure, including:

ray-plane test circuitry configured to perform a set of six ray-plane tests for the bounding volume using at most four floating-point multiplication operations by four multiplier circuits, wherein the floating-point multiplication operations operate on:

the transformed ray direction components from the ray cache circuitry; and coordinate information for the bounding volume.

18. The non-transitory computer readable storage medium of claim 17, wherein the ray cache circuitry is further configured to cache, for the ray:

a transformed active ray interval upper bound; and reciprocals of non-dominant components of the ray direction.

19. The non-transitory computer readable storage medium of claim 18, wherein the ray cache circuitry is configured to store the transformed ray direction components, the transformed active ray interval upper bound, and the reciprocals of the non-dominant components of the ray direction in a reduced-precision form, relative to initial representations of a ray direction and a ray interval.

20. The non-transitory computer readable storage medium of claim 17, wherein the ray intersect acceleration circuitry is further configured to:

determine a local ray origin interval based on a local node origin, one or more transformed ray direction components from the ray cache circuitry, and a current active ray interval value;

determine adjusted ray parametric bounds based on the active ray interval upper bound and the current active ray interval value;

perform the ray-plane tests based on the local ray origin interval; and perform comparison operations based on the adjusted ray parametric bounds and the ray-plane tests to determine an intersection result for the bounding volume.

21. The non-transitory computer readable storage medium of claim 20, wherein the ray intersect acceleration circuitry is further configured to:

retrieve a transformed ray active interval value from a traversal stack for the ray-plane tests; and push updated transformed active ray interval values onto the traversal stack for one or more intersected bounding volumes.

*   *   *   *   *